(12) United States Patent
Michael

(10) Patent No.: US 8,688,857 B1
(45) Date of Patent: Apr. 1, 2014

(54) FILTERING MESSAGES BASED ON PRUNING PROFILE GENERATED FROM PRUNING PROFILE SCHEMA

(75) Inventor: Constantinos Michael, New York, NY (US)

(73) Assignee: Google Inc., Mountain View, CA (US)

( * ) Notice: Subject to any disclaimer, the term of this patent is extended or adjusted under 35 U.S.C. 154(b) by 595 days.

(21) Appl. No.: 12/882,873

(22) Filed: Sep. 15, 2010

(51) Int. Cl.
  *G06F 15/16* (2006.01)

(52) U.S. Cl.
  USPC .......................................................... 709/246

(58) Field of Classification Search
  USPC ................................ 709/203, 219, 246; 715/864
  See application file for complete search history.

(56) References Cited

U.S. PATENT DOCUMENTS

| | | | |
|---|---|---|---|
| 5,956,026 A * | 9/1999 | Ratakonda .................... | 715/723 |
| 6,556,217 B1 * | 4/2003 | Makipaa et al. ............. | 345/667 |
| 6,611,358 B1 * | 8/2003 | Narayanaswamy .......... | 358/442 |
| 6,854,120 B1 * | 2/2005 | Lo et al. ....................... | 719/311 |
| 7,016,963 B1 * | 3/2006 | Judd et al. .................... | 709/228 |
| 2006/0107206 A1 * | 5/2006 | Koskimies .................... | 715/523 |
| 2008/0091846 A1 * | 4/2008 | Dang ............................ | 709/246 |

OTHER PUBLICATIONS

Allamaraju, Java Server Programming: Principles and Technologies, published by MightyWords, Inc., 2001, 111 pages.
Haase, Java Message Service API Tutorial, published by Sun Microsystems, Inc., 2002, 278 pages.
Seguin, "ASP.NET Spiced: AJAX," msdn.microsoft.com/en-us/library/aa479042.aspx, published by Microsoft, Sep. 2005, 15 pages.

* cited by examiner

*Primary Examiner* — Lance L Barry
(74) *Attorney, Agent, or Firm* — Sterne, Kessler, Goldstein & Fox PLLC

(57) ABSTRACT

According to an embodiment, a method of providing data by a software application is provided. The method may include retrieving a selected pruning profile. Next a result message is received from a service host based on a request message transmitted to the service host from a client. The content of the result message is then filtered based on the retrieved pruning profile. Finally, the filtered result message is sent to the client.

15 Claims, 8 Drawing Sheets

FILTERING MESSAGES BASED ON PRUNING PROFILE GENERATED FROM PRUNING PROFILE SCHEMA

FIELD

The present application generally relates to network-based applications.

BACKGROUND

Modern network-based applications can rely on the transfer of large amounts of information. As applications become more complex, the variety and amount of information that can be transferred has greatly increased. Compounding this, newly available, interesting types of information can be dramatically larger in size than older, traditional types of information. For example, video, location and map imagery is much larger in size than traditional textual information.

Firms that operate software applications that supply vast amounts of requested information are always seeking to reduce costs and improve performance. Often, reducing costs by reducing the amount of information produced by software applications can have negative consequences. Increased system resource use, added complexity, and problems associated with supporting a broad variety of client applications can all occur when firms address the problems noted above.

BRIEF SUMMARY

Embodiments described herein relate to providing data by a software application. According to an embodiment, a method of providing data by a software application is provided. The method may include retrieving a selected pruning profile. Next a result message is received from a service host based on a request message transmitted to the service host from a client. The content of the result message is then filtered based on the retrieved pruning profile. Finally, the filtered result message is sent to the client.

According to another embodiment, a system of providing results from a networked software application includes at least one pruning profile and a pruner. The pruner is configured to receive a first result message from a service host based on a request message transmitted to the service host from a client. The pruner is further configured to retrieve a selected pruning profile from the at least one pruning profile, and produce a second result message based on the selected pruning profile and the first result message. Finally, the pruner sends the second result message to the client.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

Figure 1:
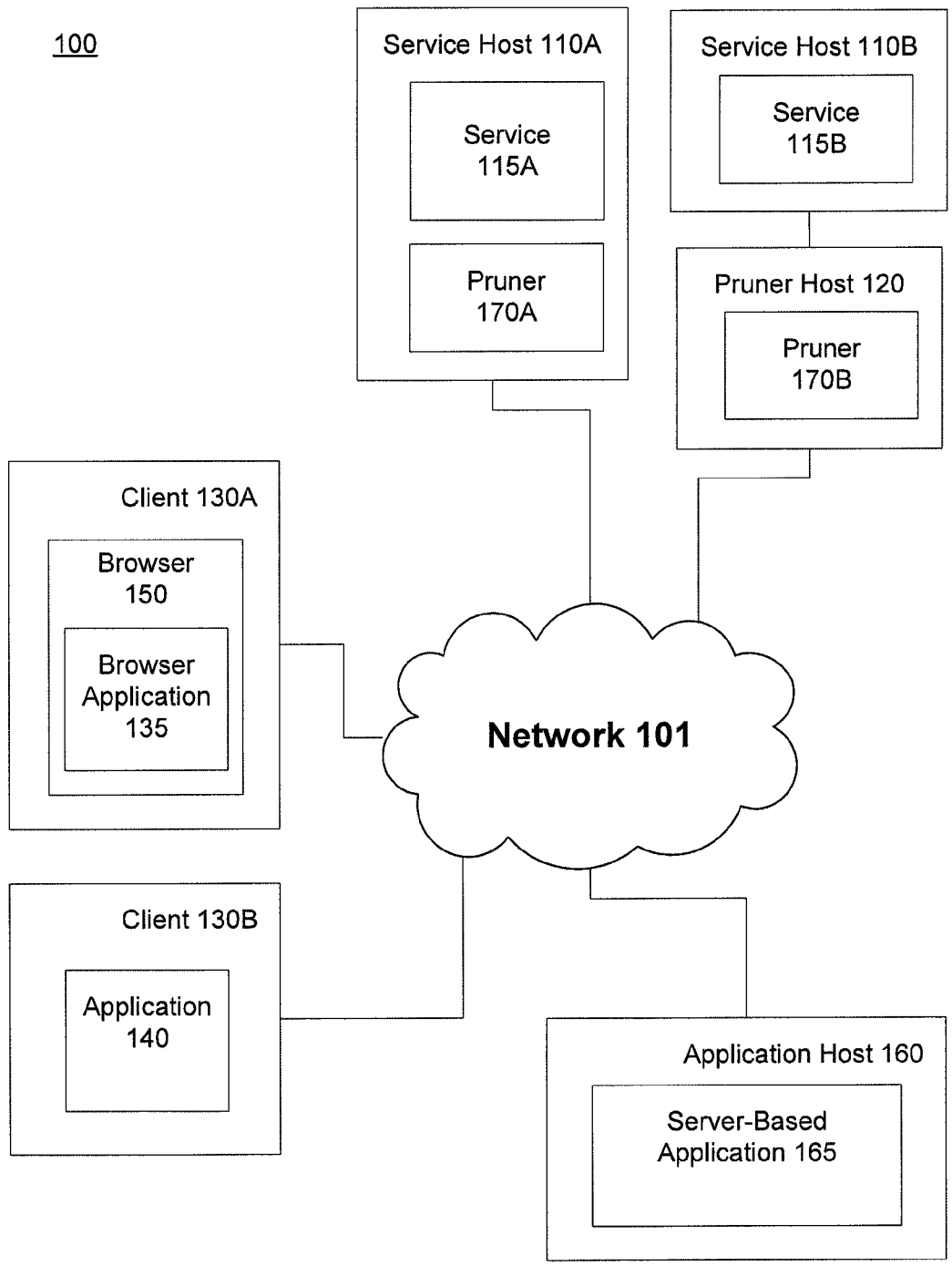
FIG. 1 is a block diagram depicting an example network application architecture, according to an embodiment.

The following detailed description refers to the accompanying drawings that illustrate exemplary embodiments. Embodiments described herein relate to providing systems and methods for providing data by a software application. Other embodiments are possible, and modifications can be made to the embodiments within the spirit and scope of this description. Therefore, the detailed description is not meant to limit the embodiments described below.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

Overview

Embodiments described herein relate to the interaction between service hosts, application hosts, and clients.

As used herein, "service hosts" can refer to computer servers that host large-scale service applications that are typically served to users over a network. "Service hosts," for example, can refer to computer systems operating to provide services such as, for example and without limitation, GOOGLE MAPS, GOOGLE EARTH AND YOUTUBE, such services being provided by Google Inc. of Mountain View, Calif.

As used herein, "application hosts" can refer to the computer servers that host applications that use the services described above as a data source for application output. In a non-limiting example, an application executing on an application host can offer a search for restaurants and, as a part of the interface, display data that has been retrieved from a service host, e.g., GOOGLE MAPS.

As used herein, "clients" can refer to computer systems that connect to application hosts and provide an interface to the applications running on such hosts. For example, a computer system having a web browser can connect to the restaurant search application and enable the searching and displaying of the restaurant results. The restaurant results, in this example, originate at the service hosts. The term "client" may also refer to the relationship of an application host to a service host. For example, the restaurant search application host can also act as a client by submitting requests to a maps service host.

As used herein, "messages" broadly refer to the request and response information relayed between the clients and hosts described above. For example, a client sends a message to an application host requesting a restaurant search. After receiving the client message, the application host sends a message to the services host to request information satisfying the search. After receiving the message from the application host, the services host sends a message containing the restaurant search result information. As would be appreciated by one having skill in the art(s), given the description herein, alternative embodiments could be used to enable different applications. For example, the client can be directed by the application host to send a search message directly to the service host, the service host responding with a result message directly sent to the client.

Some embodiments described herein alter the creation, flow and content of the types of messages noted above. By enabling different events, embodiments described herein can beneficially affect application characteristics including performance, efficiency and ease of design/evolution/maintenance.

One exemplary alteration of messages performed by embodiments is the pruning of messages originating at service hosts, such pruning reducing the content of generated messages before they are delivered to their destination. FIGS. 1-6 below describe different approaches taken by embodiments.

Pruner

FIG. 1 is an example network application architecture 100 in which embodiments of the present invention, or portions thereof, may be implemented. Network application architecture 100 includes service hosts 110A-B, application host 160, clients 130A-B and pruner host 120, in accordance with an embodiment of the present invention. While the embodiment depicted in FIG. 1 shows clients 130A-B, service hosts 110A-B, application host 160 and pruner host 120, it is important to note that other embodiments can be used to exchange data between any type of computer-implemented data sources and systems.

Service hosts 110A-B include services 115A-B respectively. Service host 110A further includes pruner 170A. Pruner host 120 includes pruner 170B and application host 160 includes application 165. Client 130A includes browser 150 operating thereon, such browser 150 executing browser application 135. Client 130B includes application 140 executing thereon. Service host 110A, host 120, application host 160 and clients 130A-B are all shown as coupled by network 101. As used herein, network 101 can be one or more networks of any type including, but not limited to, local area networks, medium area networks, or wide-area networks, such as, the Internet.

It is important to note that, while services 115A-B are depicted as each executing on single service hosts 110A-B, services 115A-B can operate in a variety of configurations, such configurations including services 115A-B spanning multiple depicted and additional service hosts (not shown). Additional computer system configurations are discussed below with the description of FIG. 8.

In an illustrative, non-limiting, example discussed with reference to FIG. 1, further details regarding the operation of pruners 170A-B are provided below, according to an embodiment:

Browser application 135 is a browser based application operating in browser 150 operating on client 130A. The server-side complement to browser application 135 is server-based application 165 operating on application host 160. Server-based application 165 is configured to exchange information with browser application 135 over network 101. An example server-based application 165 is a restaurant search application.

To provide application functions, browser application 135 and server-based application 165 can be configured to use information from services 115A-B operating on service hosts 110A-B respectively and delivered via network 101. Continuing the restaurant search example, to supply geographic information functions to server-based application 165, service 115A can be used. In this example, service 115A is a mapping application, e.g., GOOGLE MAPS.

To request information from services 115A-B, both browser application 135 and server-based application 165 can generate and send request messages to services 115A-B. For example, when a user working on client 130A searches for a restaurant, the request can be converted into a request message to be received by service 115A.

Services 115A-B can be service applications that generate result messages in response to the above-described request messages. In some examples, services 115A-B can generate very large result messages in response to a request message. For example, a request message to GOOGLE MAPS for information about a particular restaurant can produce a result message containing address information, pictures, restaurant reviews, and other descriptive characteristics.

In an example, the requesting applications (135, 165) do not require the full amount of information available in the result messages generated by services 115A-B. For example, a user performing a restaurant search may not want to see pictures or reviews. In this example, the operators of service hosts 110A-B may want to limit the amount of information that is sent between service hosts 110A-B and network 101.

Pruners 170A-B can be configured to limit the amount of information in the result messages sent by services 115A-B via network 101. In an embodiment, pruners 170A-B are configured to filter the content messages based on a selected pruning profile.

In embodiments, pruning profiles can use any format that limits the content in a result message. Pruning profiles can be created based on the format of the result messages to be generated by services 115A-B. In an embodiment, the format of the result messages can be termed the "schema" of the result message, and the format of a pruning profile can be termed the "schema" of the pruning profile. In an embodiment discussed further with respect to FIG. 3 below, the result message schema can be used to create a pruning profile schema, and the pruning profile schema can be used to create a pruning profile. It should be noted that, as used herein, discussion of selection, generation and/or specification of a pruning profile may also apply to embodiments where pruning profile schemas and/or formats are selected, generated and/or specified. In these examples, the selected, generated and/or specified pruning profile schema may be used to create a pruning profile.

One approach used by an embodiment to implement the result message pruning noted above is to require requesting applications (135, 160) to specify a pruning profile when sending a request message. For example, server-based application 165 can specify an address pruning profile for use with a simple restaurant search. A different profile could be used if more information (reviews, pictures, etc.) are needed for users. In a different embodiment, pruners 170A-B are configured to automatically select an appropriate pruning profile based on criteria including, for example and without limitation: the schema/format of the request message, the service 115A-B to which the request is directed and/or the schema/format of the result message to be produced by the selected service 115A-B.

Upon receiving request messages, services 115A-B provide result messages to pruners 170A-B respectively. Pruners 170A-B are also provided with the specified or selected pruning profile noted above.

Based on the received pruning profile, pruners 170A-B limit/filter/prune the content of the result message. Continuing the restaurant search example, having received the address pruning profile noted above, pruner 170A can filter out all of the non-address information in the initial result message provided by service 115A.

The filtered result message can be provided by pruners 170A-B to the respective requesting application. For example, browser application 135 can receive and display the pruned result message showing only address results.

This example of a restaurant search is illustrative and not intended to limit the invention. As would be apparent to a person skilled in the art given this description, other approaches to providing data to clients 130A-B from service hosts 110A-B can be used by different embodiments without departing from the spirit and scope described herein.

As would also be appreciated by one having skill in the relevant art(s), given the description herein, in different embodiments, one or more steps of the example provided above may not be performed, may be performed differently from the steps described above, may be performed in combination with additional steps, and may be performed in a different order than the order described.

In a variation of the above, instead of browser application 135 and server-based application 165 generating and receiving messages, in another embodiment, application 140 is an application installed and operating on client 130B. In this example, application 140 is a "thick-client" application that is configured to generate messages and send them directly to services 115A-B, without the involvement of application host 160. An example application 140 is GOOGLE EARTH. The operation then proceeds as described above.

In another variation, in an embodiment depicted in FIG. 1, service 115B and pruner 170B can be implemented on different computer systems (e.g., service host 110B and pruner host 120, respectively). In another embodiment, the scalability of service 115B can be beneficially affected by having multiple pruner hosts 120 with multiple pruners 170B (not shown) coupled to service host 110B. Service 115B can then provide results without the system overhead of filtering, such filtering being performed by additional distributed systems. As would be appreciated by one having skill in the relevant art(s), given the description herein, many benefits, including performance, simplification of management, can result from the division of functions described herein.

The depiction of the embodiment of pruner 170B deployed in host 120 in FIG. 1 provides an illustrative example of potential physical and logical placements of pruners 170A-B generally. It should be noted that limiting the content of result messages can be performed at many different points in network application architecture 100. For example, pruners 170A-B can provide the pruning functions described above when placed in application host 160 and clients 130A-B. Different physical and logical placements of pruners 170A-B are depicted in FIG. 2 below.

Figure 2:
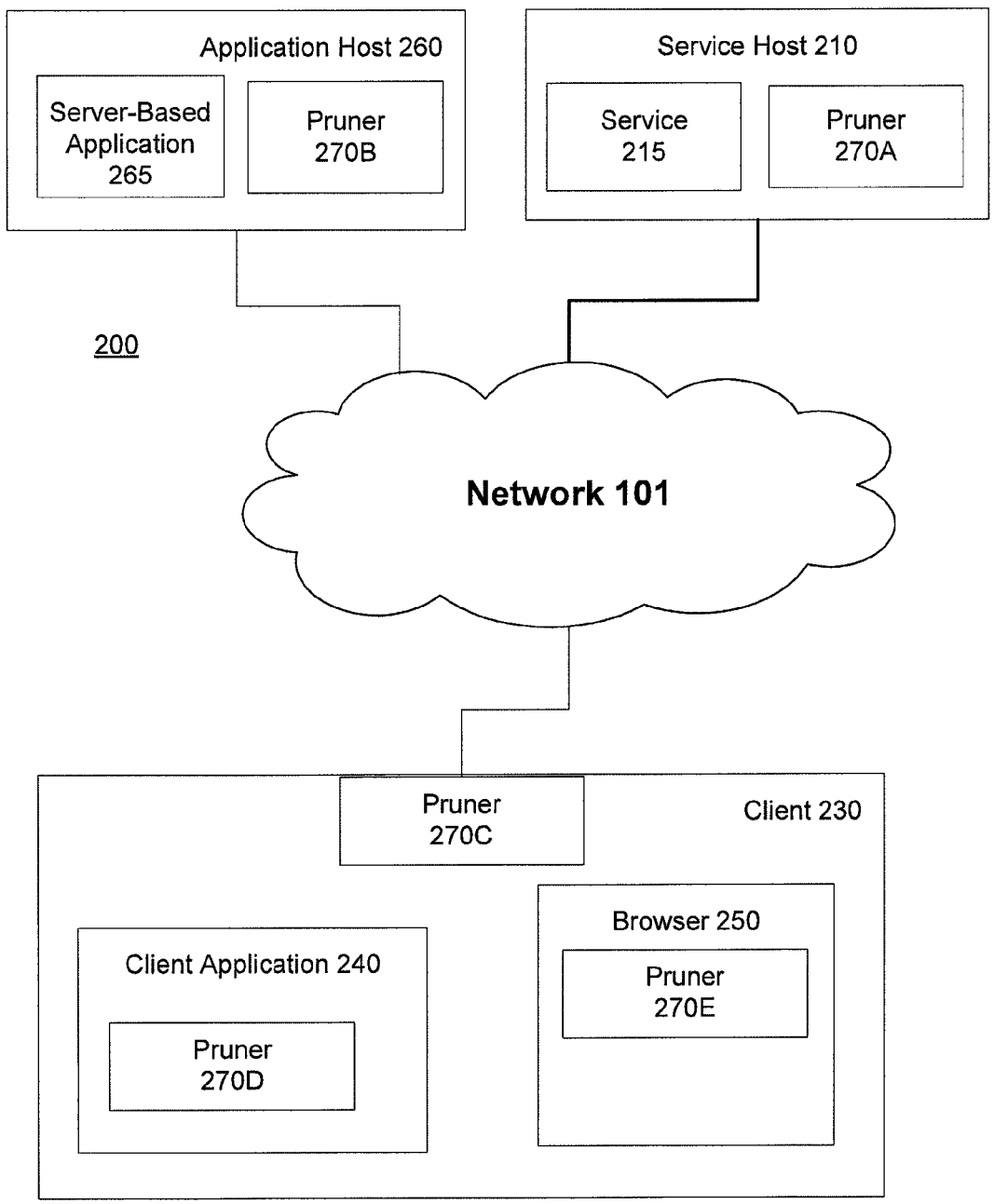
FIG. 2 is a block diagram depicting an additional example network application architecture, according to an embodiment.

FIG. 2 is an example network application architecture 200 in which embodiments of the present invention, or portions thereof, may be implemented. Network application architecture 200 includes the following components, linked by network 101: application host 260, service host 210 and client 230. Application host 260 includes server-based application 265 and pruner 270B, and service host 210 includes service 215 and pruner 270A. Client 230 includes pruner 270C, client application 240 and browser 250. Client application 240 includes pruner 270D and browser 250 includes pruner 270E.

As noted with the description of FIG. 1, the functions of pruners 270A-E can be distributed to different components of network application architecture. Embodiments described herein can use any combination of pruners 270A-E, either individually or in combination. The selection of which of pruners 270A-E to use at a given time can be based on different considerations, including performance, efficiency, and cost savings.

For example, pruners 270C-E operate on client 230 in the operating system (270C), client application 240 (270D) and in browser 250 (270E). This client-side placement differs from the server-side implementation embodiments discussed above. In an embodiment, client (270C-E) and server side implementations (270A-B) of pruner logic can be configured to beneficially interact.

Figure 3:
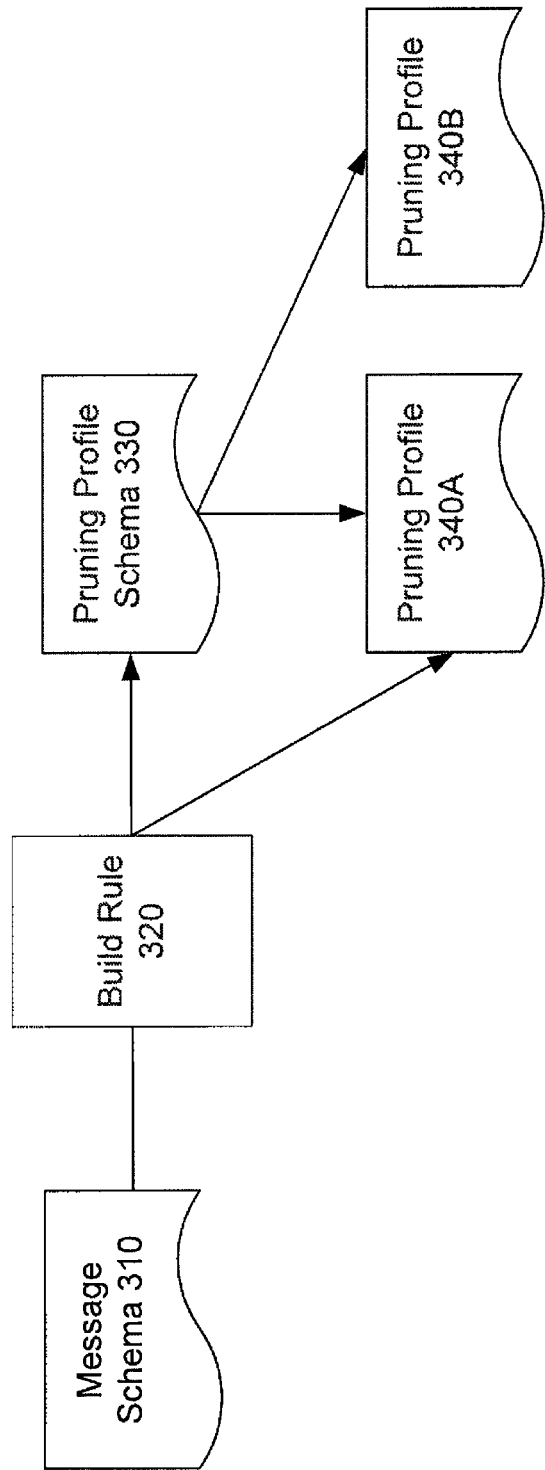
FIG. 3 depicts a process of generating a pruning profile schema from a message schema, according to an embodiment.

FIG. 3 depicts an example process for creating pruning profile schema 330 from message schema 310, according to an embodiment. Message schema 310 is processed using build rule 320, such processing resulting in pruning profile schema 330. As used generally herein, "message schema" refers to the format of a message, such format describing the content and organization of the different pieces of information that can be included in the message, and pruning profile schema refers to the format of a pruning profile, such format describing the content and organization of the different pieces of information that can be pruned using the profile. In an embodiment, pruning profile schema 330 is generated from message schema 310 using build rule 320, and pruning profiles 340A-B are generated from pruning profile schema 330. In another embodiment, pruning profile 340A can be generated directly from message schema 310 using build rule 320.

An embodiment of build rule 320 can specify the information to be filtered by pruning profile 330. Using standard build rules 320 can allow different types of pruning profiles to be created from a variety of message schemas. For example, applying an address build rule to a restaurant message schema (e.g., address, pictures, reviews, menus) can result in a pruning profile schema that can be used to generate pruning profiles that limit result messages to address information of restaurants. Applying the same build rule to a personal information message (e.g., name, address, phone number, occupation) can similarly result in a result message limited to the address information of selected people.

In an embodiment, analyzing the code of a client software application can deduce which message fields from message 310 the client application will require, and based on this analyzing, a pruning profile schema or pruning profile can be generated to satisfy the determined client requirements. In a variation of this client analysis, in an embodiment, a client application can have an internal routine that analyzes the information required by the client application and builds a pruning profile or pruning profile schema based on an analysis of message schema 310. Some embodiments using the client analysis approach above do not require build rules 320 to create pruning profile schemas 330 or pruning profiles 340A-B.

In an embodiment, pruning profiles 340A-B that are generated from a pruning profile schema 340 must conform to the schema, and can be tested for their conformity. If message schema 310 changes, pruning profile 330 can also be changed. The changes to message schema 310 may or may not affect deployed pruning profiles 340A-B. The pruning profile schema conformity testing described above can be used to identify whether pruning profiles 340A-B need to be regenerated to match a change to message schema 310.

In a non-limiting example, a field is removed from message schema 310. Based on this change, pruning profile schema 330 is also changed. Pruning profiles 340A-B are tested for conformity with pruning profile 330 and determined to be nonconforming, e.g., pruning profiles 340A-B specify that the removed field be returned. Because of this determined non-conformity, pruning profiles 340A-B are regenerated from the changed pruning profile schema 330. In an embodiment, the generation of pruning profile schemas 330 and pruning profiles 340A-B, and the location of pruning profile conformity testing depends on the implementation, occurring, for example at service host 110A, pruner host 120, application host 160 or clients 130A-B.

As would be appreciated by one having skill in the relevant art(s), given the description herein, the structure described above, with build rules producing pruning profile schemas from various message formats, can be used for a wide variety of formats, messages and applications.

Figure 4:
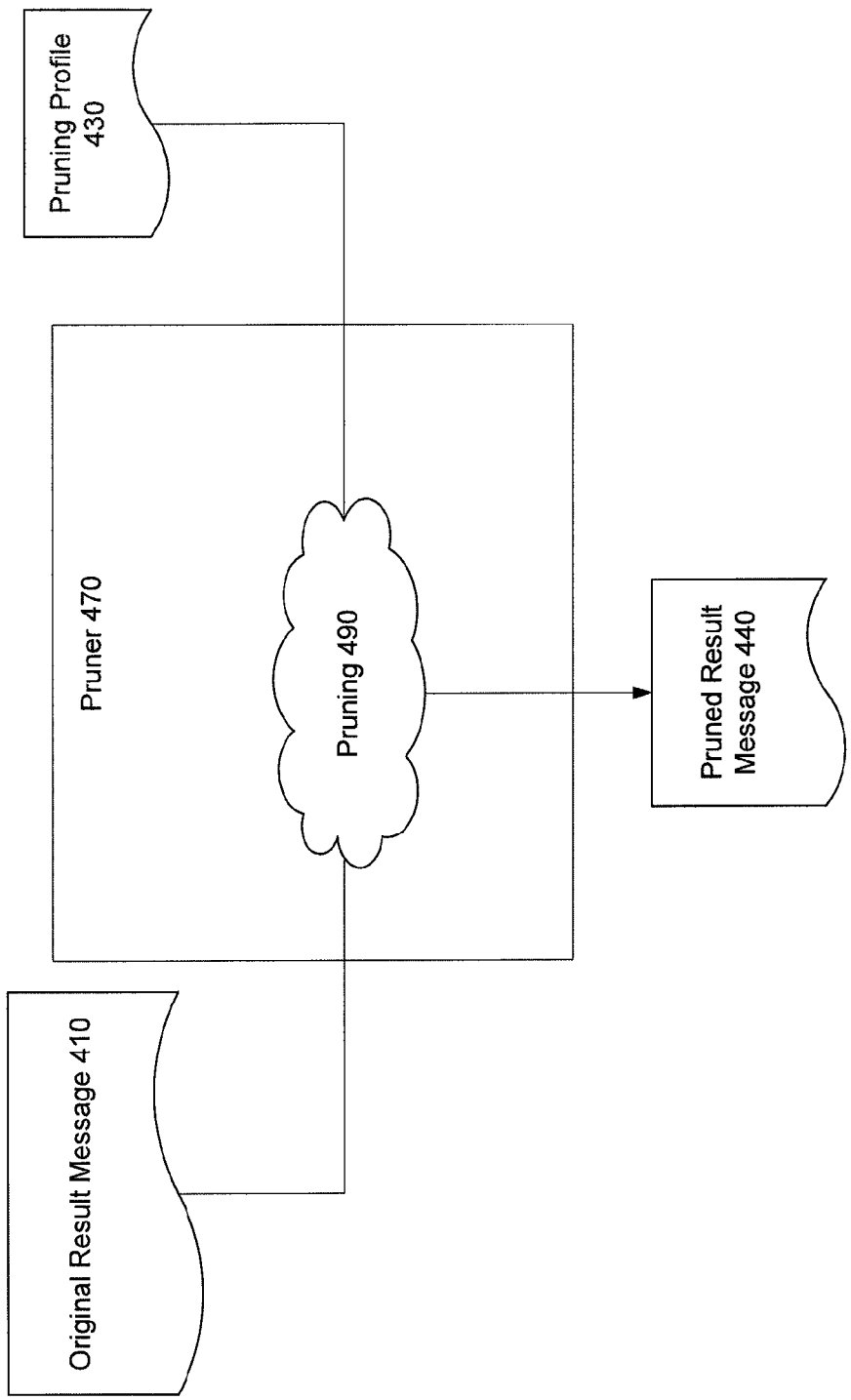
FIG. 4 is a block diagram of a more detailed view of a pruner, according to an embodiment.

FIG. 4 depicts the operation of pruner 470 according to an embodiment. Pruner 470 receives original result message 410 and pruning profile 430. Pruning 490 is an operation that combines original message 410 and pruning profile 430, resulting in pruned result message 440.

In an exemplary embodiment, pruner 470 receives original result message 410 from service 115A from FIG. 1. Original result message 410 is termed "original" because it has not been pruned/filtered. In an embodiment, original result message 410 contains the full amount of information able to be produced by service 115A in response to a request message.

Pruner 470 also receives pruning profile 430. During the depicted pruning 490 step, pruning profile 430 is used to reduce the content of original result message 410, resulting in pruned result message 440.

In an exemplary embodiment, the messages used are "protocol buffers" or "protobufs" provided by Google Inc. of Mountain View, Calif. Google Protocol Buffers allow the design of structured messages using a domain-specific language. A .proto source file is created and passed through a Google-provided tool to generate source code for a target language. An interpreter is created that encodes/decodes the structured data messages. Different embodiments described herein may use different approaches to prune protobufs (or similar messages for a different service provider) for beneficial results.

Figure 5:
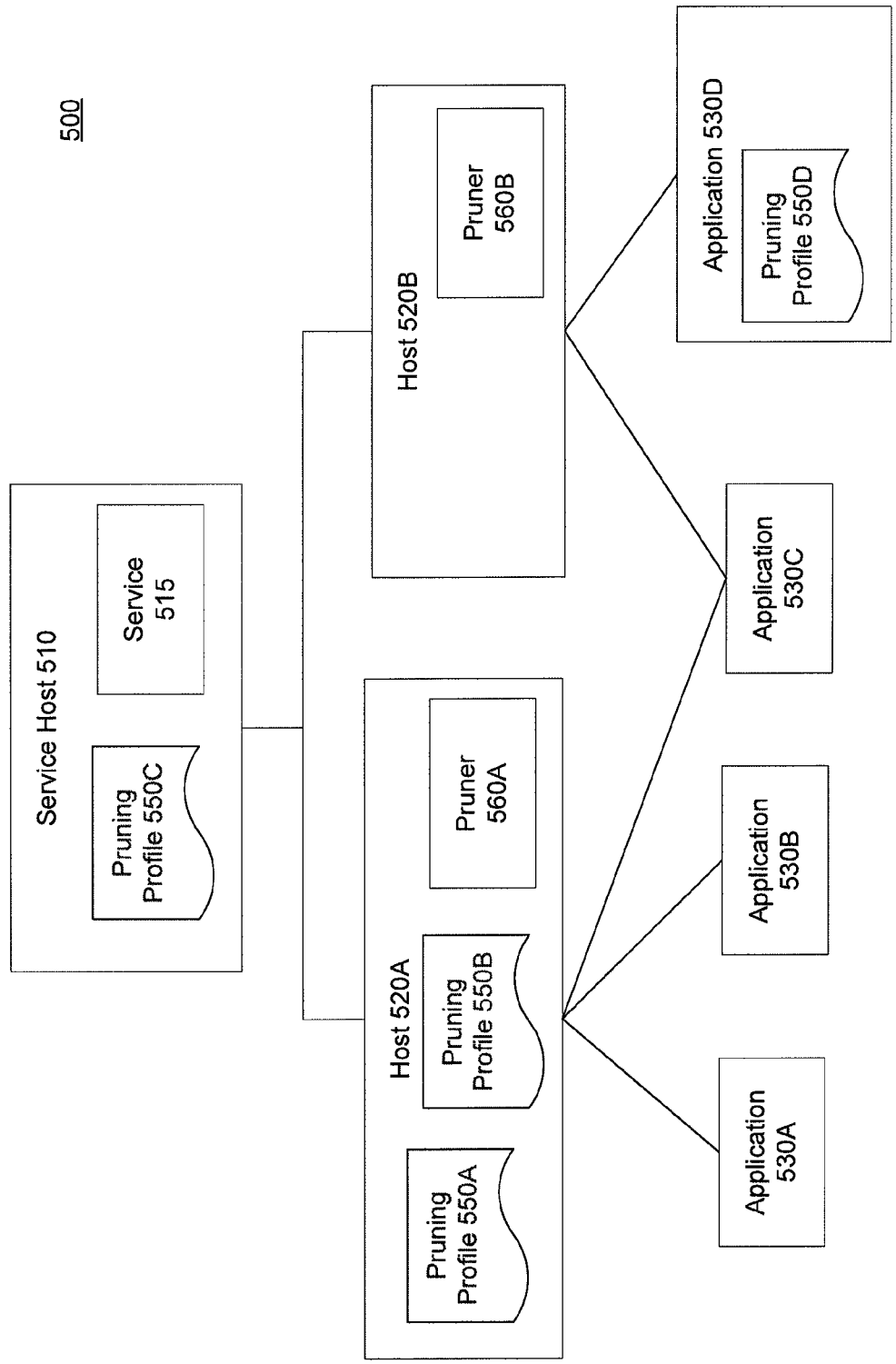
FIG. 5 is a block diagram depicting an example network application architecture, showing different placement locations for pruning profiles, according to an embodiment.

FIG. 5 is an example network application architecture 500, such architecture having different potential placements and usage of pruning profiles 550A-D, according to an embodiment. Service host 510 includes pruning profile 550C and service 515. Host 520A includes pruning profiles 550A-B and pruner 560A, and host 520B includes pruner 560B. Applications 530A-D are shown, with 530A-C being coupled to host 520A and applications 530C-D coupled to host 520B. Application 530D includes pruning profile 550D.

In different embodiments, pruning profiles can be stored and accessed using a variety of methods. FIG. 5 depicts pruning profiles 550A-B stored on host 520A and pruning profile 550C stored on service host 510. In embodiments, pruners 560A-B can access required profiles from different components in network application architecture 500. For example, if application 530D submitted a request message that specified pruning profile 550A, pruner 560B would retrieve the requested pruning profile 550A from host 520A. The retrieved pruning profile 550A would be used to prune the result message from service 515 before delivery to application 530D.

Pruning profile 550D, stored with application 530D, depicts an example wherein a pruning profile is submitted by an application along with the request message. In some embodiments described above, a request message is sent by an application along with a reference to a particular stored pruning profile. In this example, application 530D, when sending a request message to service 515, also includes pruning profile 550D with the request. Using this approach allows application developers to flexibly utilize the pruning capabilities of embodiments described herein.

In another embodiment, application developers are able to develop their own pruning profiles (e.g., 550D), but instead of sending the profile with each request, application developers can deploy their pruning profiles on hosts 520A-B and service host 510. In this example, application developers can design their own custom pruning profiles while having the performance benefit that results from the server-based deployment.

Figure 6:
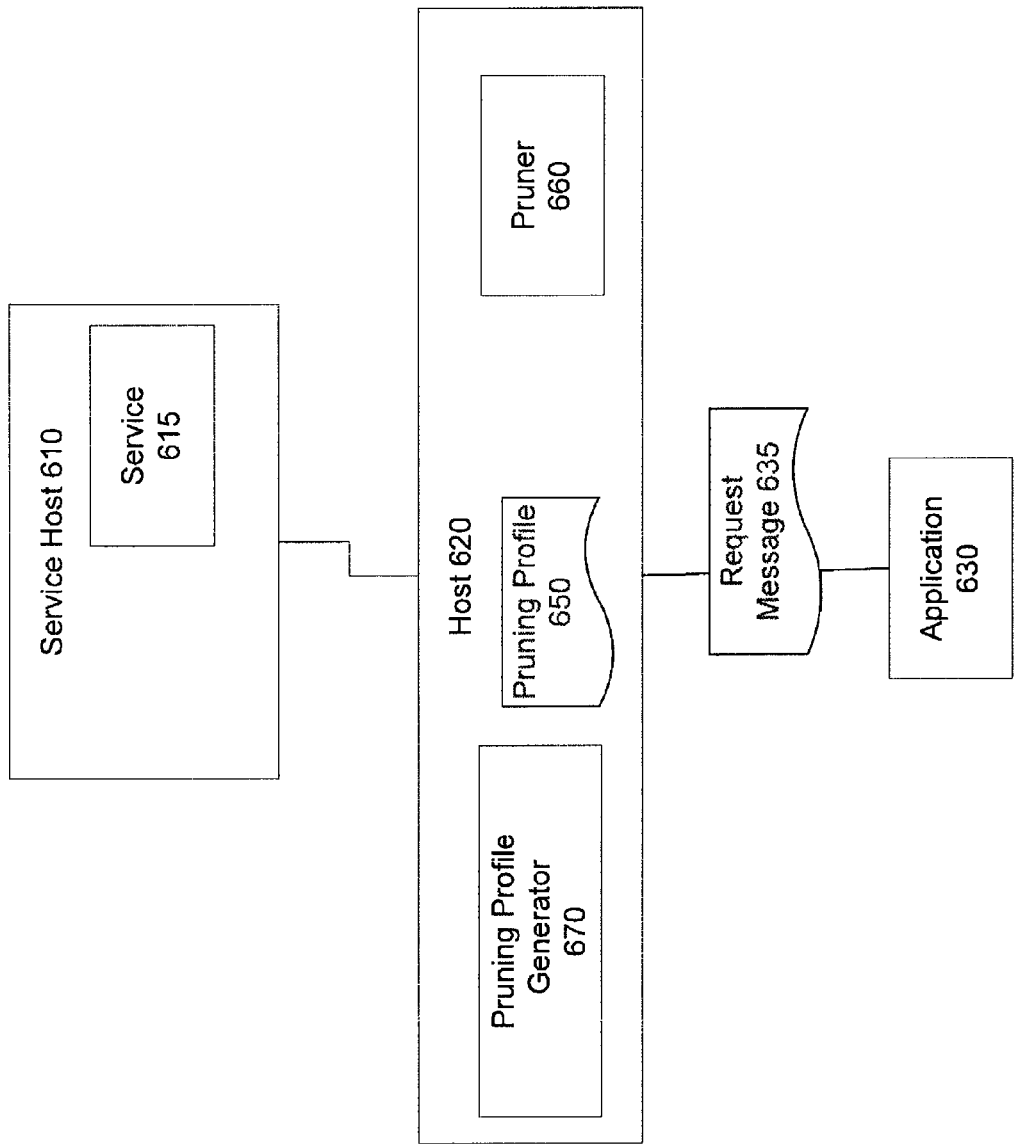
FIG. 6 is a block diagram depicting an example network application architecture having a pruning profile generator, according to an embodiment.

FIG. 6 is an example network application architecture 600, such architecture having pruning profile generator 670, according to an embodiment. Service host 610 includes service 615, and host 620 includes pruning profile generator 670, pruning profile 650 and pruner 660. Application 630 is coupled to host 620 and sends request message 635 to host 620.

In the embodiment of FIG. 3, pruning profile 330 was generated based on build rule 320. In the embodiment of FIG. 5, pruning profiles 550A-D are described as stored on network components. FIG. 1 illustrates an embodiment where different pruning profiles are created specifically for the requirements of applications 135, 140. In each of these embodiments, the pruning profiles can be created in advance of the receipt of request messages.

In an embodiment depicted in FIG. 6, pruning profile generator 670 receives request message 635 from application 630. Request message 635 can be in a format that describes the information that is wanted from service 615. Based on request 635 and the service 615 to which the request is directed, pruning profile generator 670 generates pruning profile 650. When service 615 produces a result message in response to request message 635, the result message is pruned by pruner 660 using the newly created pruning profile 650. Pruning profile 650 can be stored for future use as well. In this example, the developers of application 630 are able to benefit from a custom-designed pruning profile 650, but without having to design the custom pruning profile.

Example Implementation: Protobuf Pruning

In accordance with an embodiment, protobuf (protocol buffer) pruning is a library designed to efficiently trim down protocol buffer data, in a generic way. An embodiment exemplary protobuf pruning works in the following fashion:

1. At build time, a pruning profile schema (for example, a Protobuf Pruning Scheme Description) is generated from the original (to be pruned) protocol file containing the OriginalMessage. This is itself another protocol file.

2. A pruning protocol schema file is filled in with instructions on how to prune the OriginalMessage.

3. At serving time, MessagePruner::Prune( ) is called with the pruning profile schema and a mutable OriginalMessage.

Protobuf Pruning Schemas (Profiles)

The table below illustrates an example pruning profile schema (also referred to herein as a 'pruning schema') (listing.prune.proto) that has been generated from listing.proto:

| Original Message (listing.proto) | Generated Pruning Schema (listing.prune.proto) |
|---|---|
| package maps;<br>Listing {<br>  required string name = 1;<br>  optional string subtitle = 2;<br>  message Category {<br>    optional string name = 1;<br>    optional string description = 2; | package maps.prune;<br>Listing {<br><br>  optional bool subtitle = 4;<br>  message Category {<br>    optional bool name = 2;<br>    optional bool description = 4; |

-continued

| Original Message (listing.proto) | Generated Pruning Schema (listing.prune.proto) |
|---|---|
| }<br>  repeated Category category = 3;<br>} | }<br>  optional Category category = 6;<br>} |

The table below is an example of how the listing.prune.proto pruning profile schema can be filled in to generate a pruning profile (maps.prune.listing), and how an example original message instance is pruned using the pruning profile:

| Original Message:<br>instance of maps.Listing | Schema:<br>maps.prune.<br>Listing | Result<br>instance of maps.Listing |
|---|---|---|
| name: "Lombardi's Pizza"<br>subtitle: "America's first pizzeria"<br>category <<br>  name: "Pizza"<br>  description: "Serves pizza"<br>><br>category <<br>  name: "Italian"<br>  description: "Italian food here!"<br>> | subtitle: false<br>category <<br>  name: true<br>> | name: "Lombardi's Pizza"<br>category <<br>  name: "Pizza"<br>><br>category <<br>  name: "Italian"<br>> |

Eliminating excess result information from service hosts can result in reduced bandwidth costs. Conventional approaches to conditionally eliminating waste from protocol responses can use significant engineering resources.

Over traditional ways to control response contents, pruning can reduce (1) scalability problems as demand for service results increase, (2) confusion with request/response field correspondence, and (3) errors in protocol file filling code.

Consider this example of how message request/response formats can evolve:

A field in a ListingRequest called include_reviews might at first do exactly that, add reviews to ListingResponse, but eventually, it may also come to mean that photos should not be returned because the main Client, such as Client A, does not display photos and reviews at the same time.

Then, a Client B may want to display both, and now an include_photos might be added to ListingRequest.

Typically, Client A now has to be modified to also request photos in the proper situation, and though this is not usually a problem, it may require asking for permissions to modify Client A and timing the release (a new Client A has to roll out before a new ListingServer gets pushed.)

One solution may be to add a potentially confusing field, "include_reviews_and_photos" potentially making the request confusing and unscalable (what does it mean to include_reviews and also include_reviews_and_photos?).

Added to scalability issues is the confusion with field names. For example, a response that contains a field-named photo can have any of these request fields: include_photo, include_photos, include_picture, include_pictures, etc.

And last, the protocol file filler code, which due to a company's extensive use of protobufs can extend over most if not all of the server code, may have significant amounts of conditional statements (e.g., "if (request.include_photo( ) { . . . }") which can make the code more difficult to read and also add dependencies for the request throughout the codebase.

Embodiments described herein can reduce the significance of many of the above issues, because a response message can be pruned in a separate phase, using a well defined, simple method.

In an embodiment, the characteristics of an isolated, single binary performance (e.g., the generation of the protocol message has to be completed before it gets pruned to its wire size) are measured against the benefits of sending smaller messages across the wire, as well as improved serialization/deserialization time for the smaller sized messages.

Example Build Rule

In an example, the pruning profile schema listed above (listing.prune.proto) is auto-generated via a BUILD rule. Below is an example build rule that can be used to build the pruning profile schema above:

```
23:    genrule(name = "maps_syndication_pruning_proto_genrule",
24:        tools = [":maps_syndication_pruning_proto_wrapper"],
25:        outs = ["maps_syndication_pruning.proto"],
26:        cmd = "maps_syndication_pruning_proto_wrapper" +
27:            "maps/frontend/public/maps_syndication.proto" +
28:            "maps_syndication.MapsSyndicationProto >$@")
29:
30:    proto_library(name = "maps_syndication_pruning_proto",
31:        srcs = [" :maps_syndication_pruning.proto"],
32:        py_api_version = 2,.
33:        cc_api_version = 2,
34:        java_api_version = 2)
35:
```

In another embodiment, the build rule above can also use a single build approach.

Example Coding

In an exemplary C++ code that uses maps.Listing, an #include statement may have to be used for the protocol file. For example:

include "maps/frontend/public/maps_syndication.pb.h"

The statements below show an example reference to the pruning protocol def., and the message pruner:

include    "maps/frontend/public/maps_syndication.prune.pb.h"

include "maps/util/proto/message_pruner.h"

Below is an example statement to instantiate a pruned protocol and the Listing to be filled in:

maps::Listing listing;

maps::prune::Listing listing_prune_schema;

Different approaches exist to storing pruning schemes. For example, pruning schemes can be passed in as part of the request (just like regular protobufs) or pruning schemes can be stored with the pruner.

The following is an example of how to call a message pruner:

MessagePruner::Prune(listing_prune_schema, &listing);

In some embodiments, the pruning operation is destructive, e.g., the pruned Listing message is not preserved by default. Different embodiments can store the original Listing for later use.

Method 700

Figure 7:
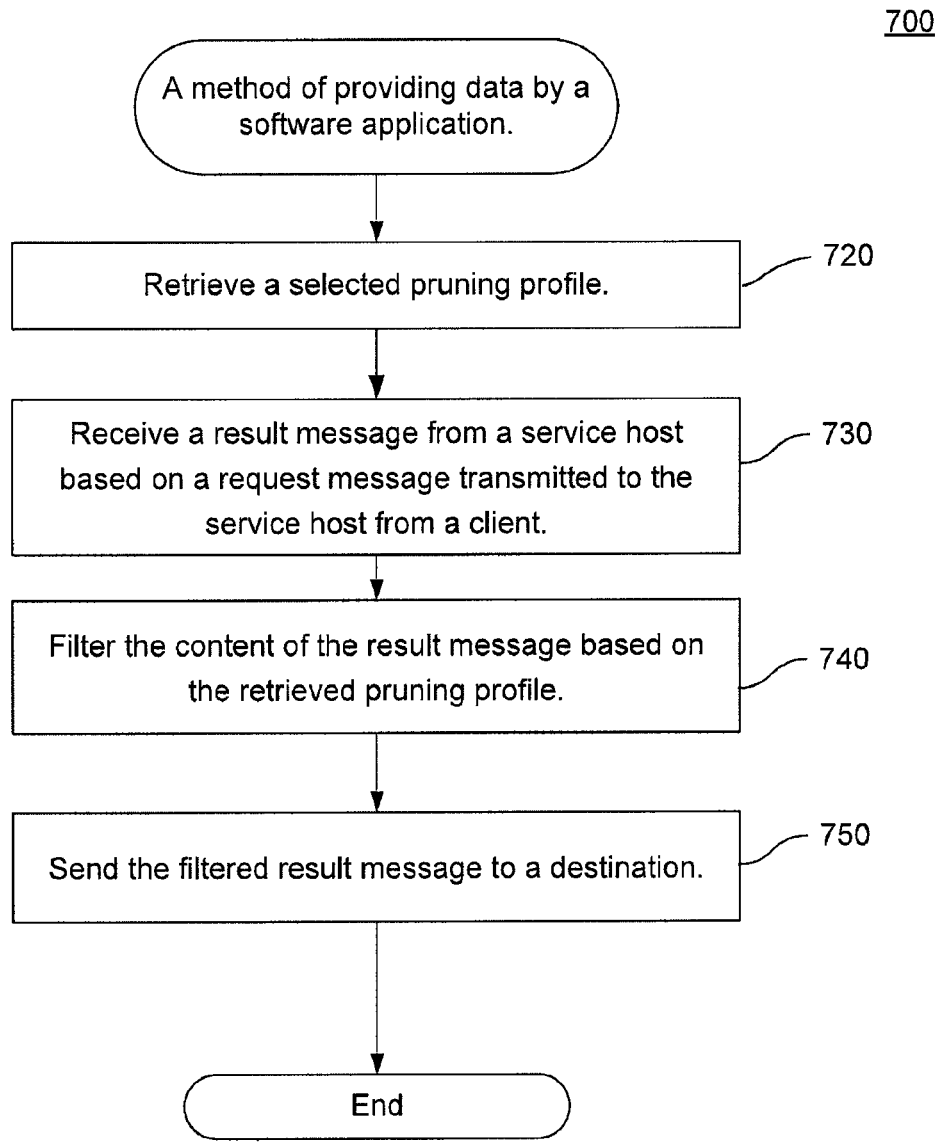
FIG. 7 shows a flowchart illustrating a method of providing data by a software application, according to an embodiment.

FIG. 7 illustrates a more detailed view of how embodiments described herein may interact with other aspects. In this example, a method of providing data by a software application is shown. Initially, as shown in stage 720 in FIG. 7, a selected pruning profile is retrieved. For example, the pruning profile 550A may be retrieved by pruner 560A of FIG. 5. At stage 730, a result message is received from a service host based on a request message transmitted to the service host from a client. For example, referring to FIG. 5, pruner 560A may receive the result message from service 515 on service host 510, such result message based on the request message from application 530A. At stage 740, the content of the result message is filtered based on the retrieved pruning profile. For example, still referring to FIG. 5, pruner 560A may filter the received result message based on retrieved pruning profile 550A. Finally, at stage 750, the filtered result message is sent to the client. For example, still referring to FIG. 5, pruner 560A may send the filtered result message to application 530A. After stage 770, the method ends.

Example Computer System Implementation

Figure 8:
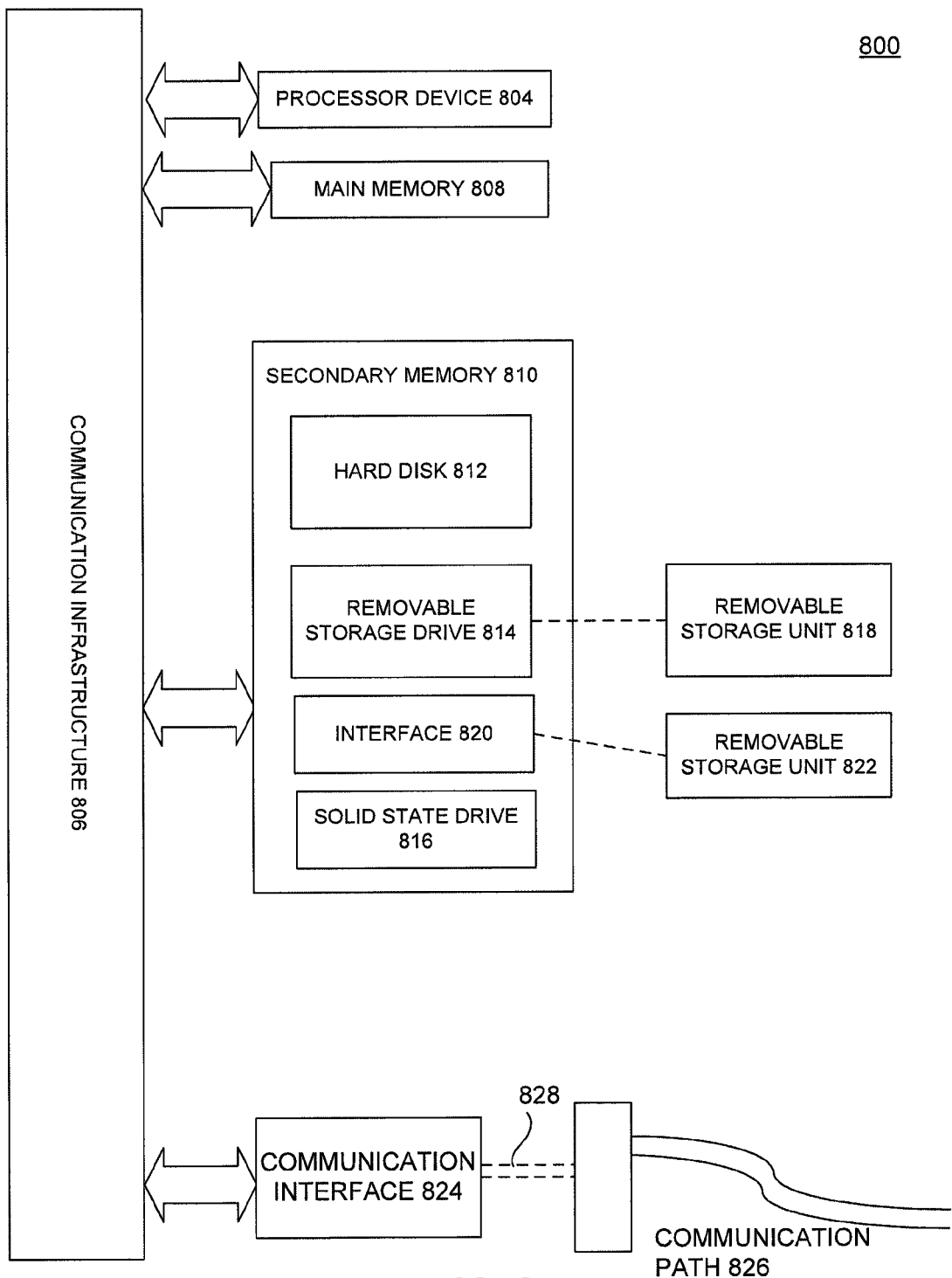
FIG. 8 depicts a sample computer system that may be used to implement an embodiment.

FIG. 8 illustrates an example computer system 800 in which embodiments of the present invention, or portions thereof, may be implemented. For example, portions of systems or methods illustrated in FIGS. 1-7 may be implemented in computer system 800 using hardware, software, firmware, tangible computer readable media having instructions stored thereon, or a combination thereof and may be implemented in one or more computer systems or other processing systems. Hardware, software or any combination of such may embody any of the modules/components in FIGS. 1-6 and any stage in FIG. 7. Clients 130A-B, service hosts 110A-B, pruner host 120 and application host 160 can also be implemented having components of computer system 800.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network or multi-core message-passing scheme.

Computer system 800 also includes a main memory 808, for example, random access memory (RAM), and may also include a secondary memory 810. Secondary memory 810 may include, for example, a hard disk drive 812, removable storage drive 814 and solid state drive 816. Removable storage drive 814 may include a floppy disk drive, a magnetic tape drive, an optical disk drive, a flash memory, or the like. The removable storage drive 814 reads from and/or writes to a removable storage unit 818 in a well known manner. Removable storage unit 818 may include a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in electronic, electromagnetic, optical, or other forms capable of being received by communications interface 824. This data may be provided to communications interface 824 via a communications path 826. Communications path 826 carries the data and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g., DRAMs, etc.).

Computer programs (also called computer control logic) may be stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the stages in the method illustrated by flowchart 700 of FIG. 7 discussed above. Accordingly, such computer programs represent controllers of the computer system 800. Where the invention is implemented using software, the software may be stored in a computer program product and loaded into computer system 800 using removable storage drive 814, interface 820, hard disk drive 812 or communications interface 824.

Embodiments of the invention also may be directed to computer program products comprising software stored on any computer useable medium. Such software, when executed in one or more data processing devices, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

Embodiments described herein relate to methods and systems and computer program products for providing data by a software application. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method for providing data by a software application, comprising:
    selecting a pruning profile generated from a pruning profile schema, wherein the pruning profile schema is generated by analyzing a request message transmitted to a service host from a client;
    retrieving the selected pruning profile;
    receiving a result message from the service host based on the request message;
    filtering the content of the result message based on the retrieved pruning profile; and
    sending the filtered result message to the client.

2. The method of claim 1, further comprising:
    before the retrieving the selected pruning profile, receiving an identifier corresponding to the selected pruning profile; and
    wherein selecting the pruning profile is based on the received identifier.

3. The method of claim 1, wherein selecting the pruning profile further comprises:
    selecting the pruning profile based on a software application that generated the request message.

4. The method of claim 1, wherein the selection of the pruning profile is based on a software application on the client.

5. The method of claim 1, wherein the request message is an Application Program Interface (API) request to the service host.

6. The method of claim 1, wherein the generated pruning profile is tested using the pruning profile schema to determine whether the generated pruning profile can prune the request message.

7. The method of claim 1, wherein the result message comprises at least one field of data.

8. The method of claim 1, wherein the result message comprises video content or map content.

9. The method of claim 1, wherein at least one of the request or result messages is binary encoded.

10. A method for providing data by a software application, comprising:
    transmitting a request message to the service host from a client;
    receiving a result message from the service host based on the request message, wherein the result message has a schema;
    retrieving a selected pruning profile, wherein the selected pruning profile is generated based on the schema;
    filtering the content of the result message based on the selected pruning profile; and
    sending the filtered result message to the client.

11. A system of providing results from a networked software application, comprising:
    at least one pruning profile; and
    a pruner stored in a memory executing on a processor, wherein the pruner is configured to:
        receive a first result message from a service host based on a request message transmitted to the service host from a client, wherein the first result message has a schema that generates a selected pruning profile included in the at least one pruning, profile;
        retrieve the selected pruning profile from the at least one pruning profile;
        produce a second result message based on the selected pruning profile and the first result message; and
        send the second result message to the client.

12. The system of claim 11, wherein the second result message contains less content than the first result message.

13. The system of claim 11, wherein the pruner is further configured to:
    receive an identifier corresponding to the selected pruning profile included in the at least one pruning profile; and
    select the selected pruning profile from the at least one pruning profile corresponding to the received identifier.

14. The system of claim 11, wherein the pruner is further configured to select the selected pruning profile based on a software application on the client.

15. A non-transitory computer-readable medium having computer-executable instructions stored thereon that, when executed by a computing device, cause the computing device to perform operations that provide data by a software application, comprising:
    selecting a pruning profile generated from a pruning profile schema, wherein the pruning profile schema is generated by analyzing a request message transmitted to a service host from a client;
    retrieving the selected pruning profile;
    receiving a result message from the service host based on the request message;
    filtering the content of the result message based on the retrieved pruning profile; and
    sending the filtered result message to the client.

* * * * *